United States Patent Office 3,654,057
Patented Apr. 4, 1972

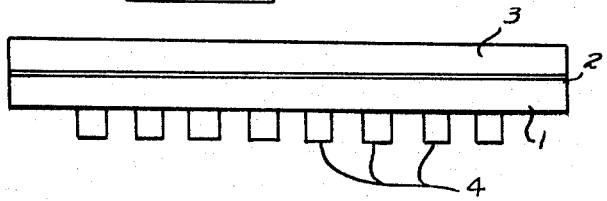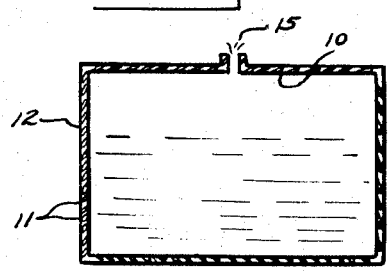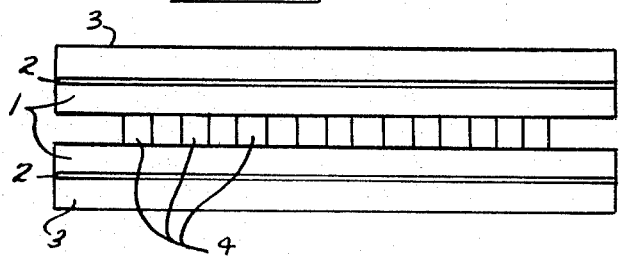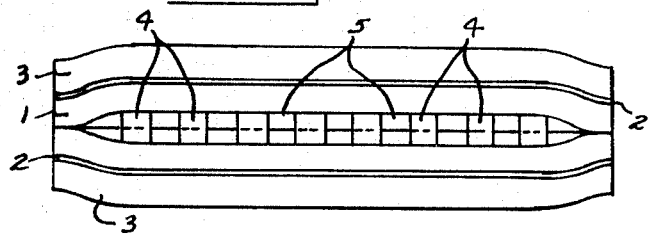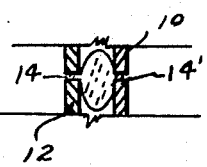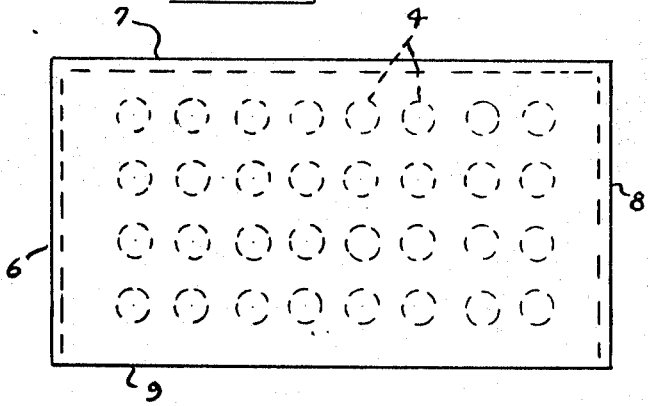

3,654,057
SELF-SEALING FUEL TANK
Albert Olevitch, 3100 Early Road, Dayton, Ohio 45415, and David H. Littlefield, Enon, Ohio (6 Kendon Road, Pittsford, N.Y. 14534)
Filed Oct. 21, 1970, Ser. No. 82,658
Int. Cl. B32b 3/12, 3/26
U.S. Cl. 161—69          5 Claims

ABSTRACT OF THE DISCLOSURE

A self-sealing fuel tank comprises two rubber layers and a plurality of sealer packages mounted between the layers. The sealer packages contain a foamable polymeric material dissolved in a highly volatile solvent. If the two rubber layers and one or more of the sealer packages are ruptured, e.g., by a bullet passing therethrough, the highly volatile solvent is exposed to the atmosphere and evaporates. Upon evaporation of the solvent, the foamable polymeric material produces a foam which plugs the bullet holes in the adjacent rubber walls. This combination of events prevents fuel from leaking out of the fuel tank. Fuel tanks of this invention are useful in military vehicles such as aircraft, tanks, and trucks which are liable to be struck by projectiles such as bullets, shells and shrapnel.

BACKGROUND OF THE INVENTION

(1) Field of the invention

This invention relates to self-sealing fuel tanks. More particularly, this invention relates to fuel tanks which will seal themselves and prevent loss of fuel upon being punctured by projectiles.

(2) Description of the prior art

The use of self-sealing fuel tanks in military vehicles is well known. Their purpose, that of sealing themselves to prevent loss of fuel when struck by bullets or other flying projectiles such as pieces of shrapnel, is obvious.

A typical prior art self-sealing fuel tank is comprised of three layers of material. An inner layer of synthetic rubber is in contact with the fuel in the fuel tank. Surrounding the inner layer is an intermediate layer of sponge rubber. The sponge rubber is adapted to swell upon contact with fuel. Around the sponge rubber layer and holding it in place is another layer of synthetic rubber. When the three layers are punctured, fuel flows through the puncture in the inner layer and comes into contact with the intermediate sponge rubber layer. Upon contact with the fuel, the sponge rubber layer swells, closes the puncture in itself, and forces itself outward into the punctures in the adjacent synthetic rubber layers. The swelling action of the sponge rubber layer is thus utilized to give the fuel tank its self-sealing properties.

The above-described type of self-sealing fuel tank has certain deficiencies. Firstly, after puncture, a considerable amount of time elapses before the sponge rubber layer swells enough to be of any value in stopping the leak. Thus, a considerable amount of fuel is lost during the elapsed time. Secondly, when pieces of shrapnel or jagged pieces of metal torn from metallic parts of the vehicle pass through the fuel tank, large portions of the three rubber layers of the fuel tank are often torn away. When this happens, even the most swellable types of sponge rubber are incapable of swelling enough to stop the leak.

BRIEF DESCRIPTION OF THE DRAWING

FIG. 1 is an elevation view of a sandwich type structure comprised of a polyethylene layer, an aluminum foil layer, and a polyester layer from which sealer packages of this invention may be fabricated.

FIG. 2 is an elevation view of two structures of the type shown in FIG. 1 placed with their polyethylene layers opposite to one another and ready to be sealed to one another to form a sealer package.

FIG. 3 is a front elevation view of two polyethylene-aluminum foil-polyester structures with the polyethylene layers thereof opposite to one another and sealed along three edges prior to filling with the polymer solution of the invention through an opening provided by the unsealed fourth edge.

FIG. 4 is a plan view of the structure of FIG. 3 which further illustrates how the sealer packages of this invention are sealed along three edges prior to filling with the polymer solution through the opening provided by the unsealed fourth edge.

FIG. 5 is an elevation view, partly in cross section, of a self-sealing fuel tank of this invention.

FIG. 6 is a partial elevation view, partly in cross section, of a portion of the wall of a self-sealing fuel tank of this invention showing portions of the two rubber layers and one sealer package.

FIG. 7 is a partial elevation view, partly in cross section, of the portion of the wall of the self-sealing fuel tank illustrating how the foam produced by the foamable polymer acts to plug holes in the wall.

SUMMARY OF THE INVENTION

It has now been found that the above-mentioned deficiencies are not present in gas tanks constructed of two synthetic rubber layers and an interposed plurality of sealer packages, containing a foamable polymeric material dissolved in a highly volatile solvent. The term "synthetic rubber," as used in this specification, means an elastomeric product such as Buna N (polybutadiene), butyl rubber or SBR (styrene-butadiene copolymer) from which fuel tanks are ordinarily constructed.

If one (or more) of the interposed sealer packages is ruptured, e.g., by a bullet passing through it and the adjacent synthetic rubber layers, the volatile solvent is exposed to the atmosphere and, because of its high vapor pressure, immediately evaporates. Evaporation of the solvent causes the polymeric material to foam. The foam thus produced fills the bullet holes in the adjacent rubber walls and plugs them. The foam produced from the sealer packages of this invention is capable of stopping the loss of fuel from relatively large ruptures, such as those caused by pieces of shrapnel, as well as from small, clean bullet holes. Also, foam forms almost instantaneously upon rupture of a sealer package, and thus stoppage of leaks occurs almost instantaneously.

DESCRIPTION OF THE PREFERRED EMBODIMENTS

The following description of the preferred embodiment is divided into three sections. The first section describes the preparation of sealer package contents. The second section describes the preparation of sealer packages and the introduction of contents thereinto. The third section describes a fuel tank which utilizes, as the means for self-sealing, a plurality of the sealer packages of this invention.

SEALER PACKAGE CONTENTS

The contents of the sealer packages of this invention are a foamable polymeric material, such as polystyrene, dissolved in a highly volatile solvent. A solvent which evaporates almost instantaneously at atmospheric pressure and at temperatures considerably below room temperature is utilized because military vehicles, and in particular military aircraft, often operate under low temperature conditions and naturally operate at or under one atmosphere of pressure. A list of suitable solvents along with their respective boiling points appears in the following table.

TABLE

| Solvent: | Boiling point, (° C.) |
|---|---|
| Ammonia | −33 |
| Chloropentafluoroethane | −39 |
| Chlorotriflouroethylene | −28 |
| Cyclopropane | −33 |
| Dichlorodifluoromethane | −30 |
| 1,1-difluoroethane | −25 |
| Methylacetylene | −23 |
| Methylchloride | −24 |
| Perfluoropropane | −37 |
| Propane | −42 |
| Propylene | −47 |
| Dimethyl ether | −25 |

All of the solvents appearing in the table are gaseous at room temperature and under atmospheric pressure. Therefore, dissolution of the foamable polymeic material therein must be carried out under conditions which involve either high pressure or low temperature or a combination of the two. For example, dissolution of polystyrene in dimethyl ether may be carried out by placing a weighed amount of polystyrene in pellet form in a chilled container held at about −30° C. by means of Dry Ice or some other coolant, pouring an equal weight of dimethyl ether (also at about −30° C.) over the pellets, and shaking until the polystyrene dissolves.

Since the ultimate value of the sealer package contents depends upon their ability to produce foam, it is preferable that at least about 40 weight percent of any solution be foamable polymeric material. The solvents in the table have thus been chosen for their ability to dissolve polystyrene as well as for their high volatility. The solvents will form solutions which contain from about 40 to about 60 weight percent polystyrene.

After shaking to effect dissolution, the solution must, of course, be kept either under high pressure or low temperature conditions until it is sealed in a sealer package in order to prevent evaporation of the solvent.

SEALER PACKAGES

The sealer packages of this invention must be impermeable to gaseous molecules of the solvent placed therein. That is, after a solution of foamable polymeric material in a highly volatile solvent is sealed into a sealer package and the package is allowed to come to ambient temperature, some of the solvent will evaporate and an equilibrium, within the sealer package, between gaseous solvent and liquid solvent will be reached. If gaseous solvent escapes through the walls of the sealer package, eventually enough of the solvent will escape to permit the foamable polymeric material to foam within the sealer package. This, of course, is not desirable. Thus, it is imperative that the walls of the sealer package be impervious to gaseous molecules of the solvent and prevent them from escaping.

A better understanding of the invention can be obtained by referring to the drawing in which identical reference numerals have been used to designate similar elements.

Sealer packages of this invention may be fabricated from layered or sandwich type structures, the layers of which are polyethylene, aluminum foil, and a polyester. FIG. 1 represents a layered structure which will constitute one part of a final sealer package. The numeral 1 represents the polyethylene layer which, to form a final sealer package, will be heat sealed, along the edges to another polyethylene layer of another sandwich type structure. An aluminum foil layer 2 is attached, by means of adhesive to the back of the polyethylene layer 1. In turn, a polyester layer 3 is attached, by means of adhesive, to the aluminum foil layer 2. The sandwich type structure may be of any desirable shape. For example, it may be square, rectangular, oval, or round. It is shown as a rectangle in the drawing merely for convenience of description. The sandwich type structure shown in FIG. 1 of the drawing has polyethylene columnar members 4 attached to and protruding from the polyethylene layer 1. Columnar members 4 may be adhesively attached to the polyethylene layer 1 or, since they are also polyethylene, may be heat sealed to polyethylene layer 1. In a final sealer package, columnar members 4 are heat sealed or adhesively attached to another polyethylene layer of another polyethylene-aluminum foil-polyester sandwich type structure and the polyethylene layers of the two sandwich type structures are heat sealed together along their edges. Columnar members 4, by being attached at both ends, within the sealer package, to the inner polyethylene layers of the sealer package walls, assist in preventing the sealer package from bulging outwardly and rupturing when it is subjected to the vapor pressure of the highly volatile solvent which makes up part of the above-described contents. The columnar members are shown to be circular in cross section in the drawing. However, they, like the layered structures to which they are attached, may be square, rectangular, oval, or even triangular in cross section. Polyethylene films and aluminum foil are of course, well known, commercially available materials. A polyester which has been found suitable for use in forming sealer packages of this invention is polyethylene terephthalate. Polyethylene terephthalate is sold commercially as a film by E. I. du Pont de Nemours and Company under the trademark Mylar.

FIG. 2 of the drawing is a side view of two layered structures of the type depicted in FIG. 1, having a plurality of polyethylene columnar members interposed between them and attached, either adhesively or by heat sealing, to the two polyethylene layers 1. As explained above, the columnar members will, in a completed and filled sealer package, act to prevent the vapor pressure of the contents from bulging the package outwardly and rupturing it.

FIG. 3 of the drawing is a side view of the two layered structure of FIG. 2 after three edges of the polyethylene layers have been heat sealed together to form a bag-like structure suitable for filling with the above-described sealer package contents. The polyethylene layers, aluminum foil layers, polyester layers, and columnar members are, as in previous figures, indicated by the numerals 1, 2, 3 and 4 respectively. Space for the contents is indicated by the numeral 5. The fourth edge, nearest the viewer, remains open and unsealed in order to allow filling of the package with the sealer package contents.

FIG. 4 of the drawing is a top view of two sandwich type structures sealed along three edges. The sealed edges are indicated by the numerals 6, 7, and 8. The open edge which is to be utilized for admittance of the solution is designated by the numeral 9.

To introduce the solution into the sealer packages, sealed edge 7 and most of sealed edges 6 and 8 are submerged in a refrigerated medium, such as in a mixture of ether and Dry Ice, having a temperature somewhat below the boiling point of the solvent. The solution is poured from its refrigerated container into the refrigerated, partially sealed sealer package. After filling the sealer package to form about 80% to about 90% of its capacity, the polyethylene layers of edge 9 are sealed by pressing them together and heat treating them while the remainder of the package is kept submerged in the refrigerated solution. This prevents solvent from evaporating during the final sealing of the last edge.

After all four edges of the sealer are closed, the package is slowly brought to ambient temperature. The impervious nature of the package prevents evaporation of the solvent contained therein. As indicated above, after the sealer package and its contents are brought to ambient temperature, some of the solvent evaporates and an equilibrium between liquid solvent and gaseous solvent is established within the sealer package. The polyethylene-aluminum foil-polyester construction of the sealer package prevents gaseous molecules of the solvent from escaping and thus insures that liquid solvent remains present in the package. The continued presence of liquid solvent prevents the foaming of the foamable polymeric material at an inopportune moment. On the other hand, if the package is ruptured, the liquid solvent therein immediately evaporates and the foamable material foams. It is this combination of events which enable the sealer packages to perform their function which is to produce foam which, in turn, stops leaks in punctured gas tanks. Since all of the solvents listed in the table are extremely volatile, evaporation and foaming occur almost instantaneously upon rupture of a sealer package.

The foregoing is a description of one way to fabricate a sealer package and fill it with a solution. Sealer packages can be fabricated in other ways. The essesntial features of a sealer package are those which act to prevent gaseous molecules of the solvent from escaping from a sealed sealer package. These essential features are (1) an inner layer of polyethylene which contains the solvent, (2) a backing layer of aluminum foil adhesively attached to the polyethylene layer, (3) a polyester layer attached adhesively to the aluminum foil layer, and (4) at least one columnar member attached at its two ends to the inner polyethylene portion of the package. The polyethylene-aluminum foil-polyester combination has been found to be very effective in preventing the escape of gaseous solvent from a sealer package and thus maintaining enough liquid solvent within the sealer package to prevent premature foaming of the foamable polymeric material. The attached columnar members, as stated above, assist in preventing the package from bulging out and rupturing because of the vapor pressure of the solvent contained therein.

SELF-SEALING FUEL TANK

A self-sealing fuel tank which utilizes the above-described sealer packages as its means for self-sealing may be fabricated from two layers of synthetic rubber and a plurality of sealer packages. One layer of synthetic rubber is, as in ordinary fuel tanks, utilized to contain the fuel. A plurality of the sealer packages is affixed, by means of adhesive, to the outer portion of the fuel containing layer. An outer layer of synthetic rubber in close contact with the plurality of sealer packages assists in keeping them in close contact with the fuel containing layer.

FIG. 5 is a cross-sectional view of a self-sealing fuel tank of this invention. The fuel tank has an opening 15 to permit entry of fuel and the walls of the tank are made up of two layers of rubber and an interposed plurality of sealer packages. An inner rubber layer 10 is, in a fuel containing tank, in contact with the fuel. Solution containing sealer packages 11 are attached, by means of adhesive, to the outside of inner rubber layer 10. A plurality of sealer packages 11 are utilized. The number of sealer packages must, of course, be large enough to permit covering of the entire outer surface of inner layer 10 in order to prevent bullets from passing through the fuel tank wall without rupturing a sealer package. Outside of the plurality of sealer packages 11, an outer rubber layer 12 is provided. The outer rubber layer 12 performs two functions. Firstly, it insures that the sealer packages, which are adhesively attached only along one edge to the inner layer 10, remain in close contact with the inner layer. Secondly, the outer rubber layer provides a buffer between any outside metal parts of a vehicle and the sealer packages 11. If a metal surface were placed next to the sealer packages 11, in lieu of the rubber layer 12, projectiles passing therethrough would in all probability, tear jagged openings therein. And it would be likely that the periphery of bullet or shrapnel holes produced in metal would have inwardly projecting jagged protrusions around them. These would, of course, hinder foam produced from a ruptured sealer package from carrying out its function of filling holes produced by projectiles. The outer rubber layer is, therefore, necessary to insure that foam generated by a ruptured sealer package be contained and fill any opening made by the projectile that caused the rupture.

FIG. 6 is a cross-sectional view of a portion of the wall of a fuel tank of this invention. The inner rubber layer thereof is again indicated by the numeral 10, the outer rubber layer by 12 and one sealer package 11 is shown. If a bullet should pass through the portion of the wall shown in FIG. 6, the following events would occur:

(1) The sealer package 11 would be ruptured and the solvent therein would immediately evaporate due to exposure to the atmosphere.

(2) Upon evaporation of the solvent, the foamable polymer would foam.

(3) The foam thus produced would plug the bullet holes in rubber layers 10 and 11.

FIG. 7 of the drawing shows the same portion of the fuel tank wall shown in FIG. 6 after a bullet has passed therethrough. Again, the inner artificial rubber layer is designated by the numeral 10 and the outer artificial rubber layer by 12. The numeral 13 designates foam which has formed and pushed into bullet holes 14 and 14'. It will be noted that foam 13, in addition to plugging the bullet holes 14 and 14', also spreads between rubber layers 11 and 12. It has been found that the presence of other, unruptured sealer packages, adjacent to the ruptured one (or more) serve to confine the outward spreading of foam between the rubber layers. That is, surrounding unruptured sealer packages prevents the foam from spreading between the rubber layers an thus not carrying out its function of plugging the bullet holes.

If a large projectile, such as a piece of shrapnel, passes through the fuel tank wall and produces a large hole therein, more than one sealer package will be ruptured. The number of sealer packages ruptured depends upon the size of the projectile passing through. And the amount of foam produced depends upon the number of sealer packages ruptured. Thus, the sealer packages of this invention are able to perform the function of plugging the holes either in the case where a single small bullet produces a small bullet hole or in the case where a piece of shrapnel or other large projectile produces a large opening or tear.

In another embodiment of this invention, gas tanks may be fabricated from both synthetic rubber layers and sponge rubber layers in addition to the sealer packages. For example, a gas tank wall may consist of (1) an inner synthetic rubber layer, (2) a sponge rubber layer, (3) a sealer package layer, (4) another sponge rubber layer, and finally (5) an outer synthetic rubber layer. In this manner advantage may be taken of the swellability of sponge rubber as well as the foam produced by ruptured sealer packages.

We claim:

1. A self-sealing fuel tank comprising two synthetic rubber layers and a plurality of sealer packages interposed therebetween, said sealer packages containing a solution of a foamable polymeric material in a highly volatile solvent.

2. A self-sealing fuel tank according to claim 1 wherein said foamable polymeric material is polystyrene and wherein said highly volatile solvent is selected from the group consisting of ammonia, chloropentafluoroethane, chlorotrifluoroethylene, cyclopropane, dichlorodifluoromethane, 1,1 - difluoroethane, methylacetylene, methylchloride, perfluoropropane, propane, propylene, and dimethyl ether.

3. A self-sealing fuel tank according to claim 1 wherein said solution contains from about 40 to 60 weight percent of said foamable polymeric material.

4. A sealer package comprising (1) an inner layer of polyethyelne which surrounds and is in contact with a foamable polymer dissolved in a highly volatile solvent;

(2) at least one polyethylene columnar member attached at both its ends to the inside of the polyethylene layer in a manner which prevents the polyethylene layer from being bulged outwardly by vapor pressure from the highly volatile solvent;
(3) a layer of aluminum foil adhesively attached to the outside of said polyethylene layer; and
(4) an outer layer of polyester adhesively attached to the outside of said aluminum foil layer.

5. A sealer package according to claim 4 wherein said foamable polymer is polystyrene and said highly volatile solvent is selected from the group consisting of ammonia, chloropentafluoroethane, chlorotrifluoroethylene, cyclopropane, dicholordifluoromethane, 1,1 - difluoroethane, methylacetylene, methylchloride, perfluoropropane, propane, propylene, and dimethyl ether.

References Cited
UNITED STATES PATENTS

| | | | |
|---|---|---|---|
| 3,291,333 | 12/1966 | House | 161—405 |
| 3,536,576 | 10/1970 | Schwartz | 161—405 |
| 3,563,846 | 2/1971 | Harr | 161—405 |

WILLIAM J. VAN BALEN, Primary Examiner

U.S. Cl. X.R.

161—161, 405; 220—9